United States Patent
Wyler

(10) Patent No.: US 9,991,950 B2
(45) Date of Patent: Jun. 5, 2018

(54) COMMUNICATION-SATELLITE SYSTEM WITH ENHANCED CAPACITY IN DESIGNATED LOCATIONS

(71) Applicant: WorldVu Satellites Limited, St Helier, Jersey (GB)

(72) Inventor: Gregory Thane Wyler, Sewalls Point, FL (US)

(73) Assignee: WorldVu Satellites Limited, Channel Islands (GB)

( * ) Notice: Subject to any disclaimer, the term of this patent is extended or adjusted under 35 U.S.C. 154(b) by 325 days.

(21) Appl. No.: 14/808,422

(22) Filed: Jul. 24, 2015

(65) Prior Publication Data

US 2017/0026109 A1     Jan. 26, 2017

(51) Int. Cl.
| | |
|---|---|
| *H04B 7/185* | (2006.01) |
| *H04B 10/118* | (2013.01) |
| *B64G 1/10* | (2006.01) |
| *H04B 7/195* | (2006.01) |

(52) U.S. Cl.
CPC ....... *H04B 7/18519* (2013.01); *B64G 1/1007* (2013.01); *B64G 1/1085* (2013.01); *H04B 7/18523* (2013.01); *H04B 7/195* (2013.01); *H04B 10/118* (2013.01)

(58) Field of Classification Search
CPC ................ B64G 1/1007; B64G 1/1085; H04B 7/18519; H04B 7/195
See application file for complete search history.

(56) References Cited

U.S. PATENT DOCUMENTS 6,081,227 A * 6/2000 Haber .................. H01Q 1/288
342/354

FOREIGN PATENT DOCUMENTS

| EP | 0588697 A1 | 3/1994 |
|---|---|---|
| EP | 1079546 A2 | 2/2001 |
| EP | 1110862 A2 | 6/2001 |

OTHER PUBLICATIONS

Authorized Officer: Brigitte Bettiol, "International Search Report" dated Oct. 21, 2016 in counterpart PCT Application No. PCT/IB2016/054353.
Authorized Officer: Brigitte Bettiol, "Written Opinion of the International Searching Authority" dated Oct. 21, 2016 in counterpart PCT Application No. PCT/IB2016/054353.

* cited by examiner

*Primary Examiner* — Nicholas McFall
(74) *Attorney, Agent, or Firm* — Kaplan Breyer Schwarz, LLP

(57) ABSTRACT

A communication-satellite system for providing communication services to the entire Earth is based on a plurality of satellites in low-earth-orbit (LEO). The satellites orbit the Earth in a plurality of orbits, with multiple satellites in each orbit. This orbital arrangement results in some locations on the surface of the Earth receiving redundant satellite coverage. Embodiments of the present invention can selectively and adaptively rotate the orientation of some of the satellites so as to transfer some of the redundant coverage from locations where it is not needed to locations where the redundant coverage is advantageous.

20 Claims, 19 Drawing Sheets

Communication satellite in LEO polar orbit

Satellite coverage area and subsatellite point

Tiling with quasi-rectangular coverage areas

Satellite ground track

Continuous coverage via multiple co-orbiting satellites

Coverage strip of multiple co-orbiting satellites

Multiple orbits for additional coverage

Adjacent coverage strips

Communication satellite system with 18 LEO polar orbits and 36 satellites in each orbit

*FIG. 10* Satellite coverage at the Equator
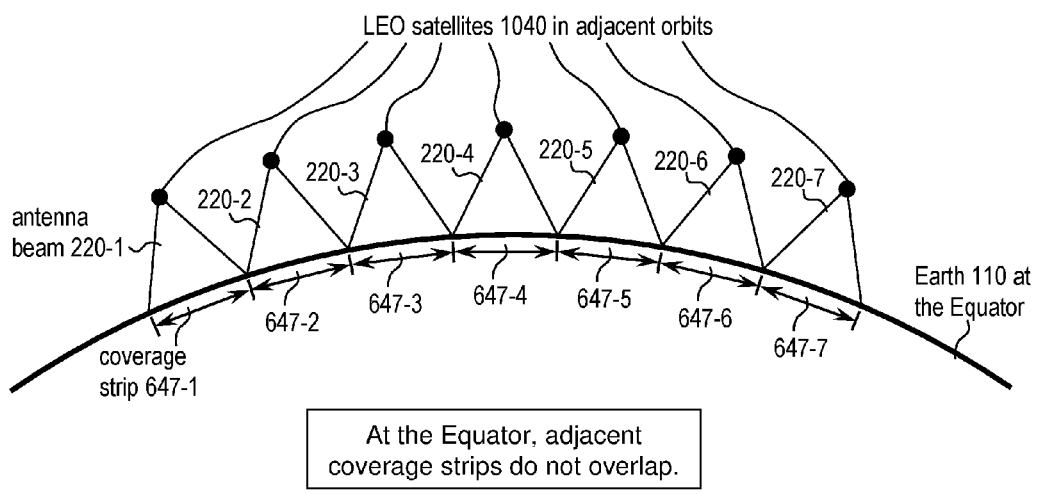
*FIG. 11* Satellite coverage at low latitudes (e.g., latitude=30°)
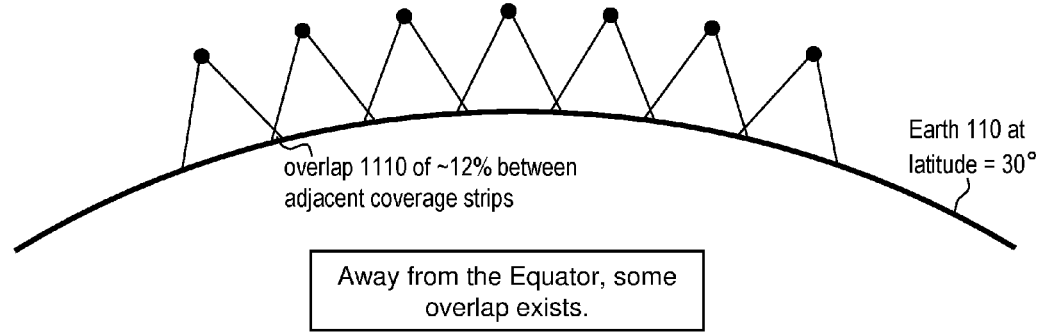

*FIG. 12* Increased overlap via satellite tilting
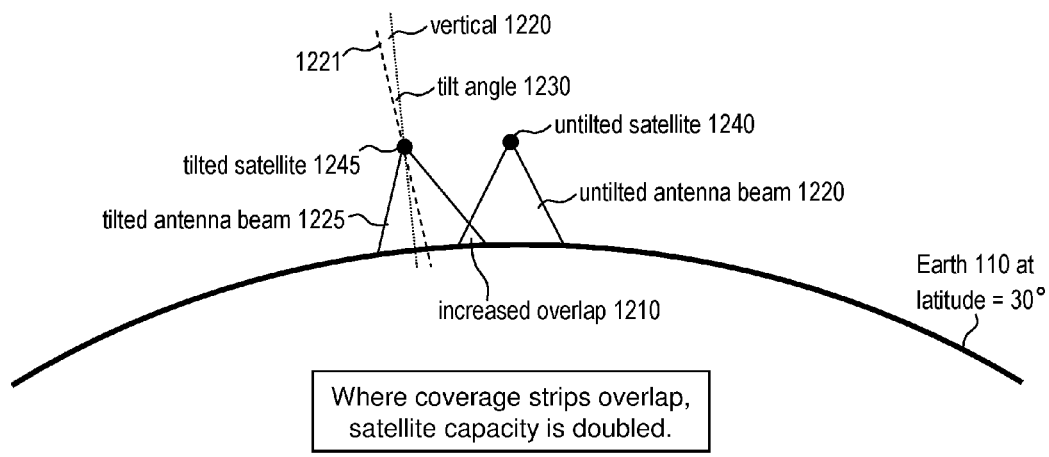
Where coverage strips overlap, satellite capacity is doubled.
*FIG. 13* Maximum overlap increase
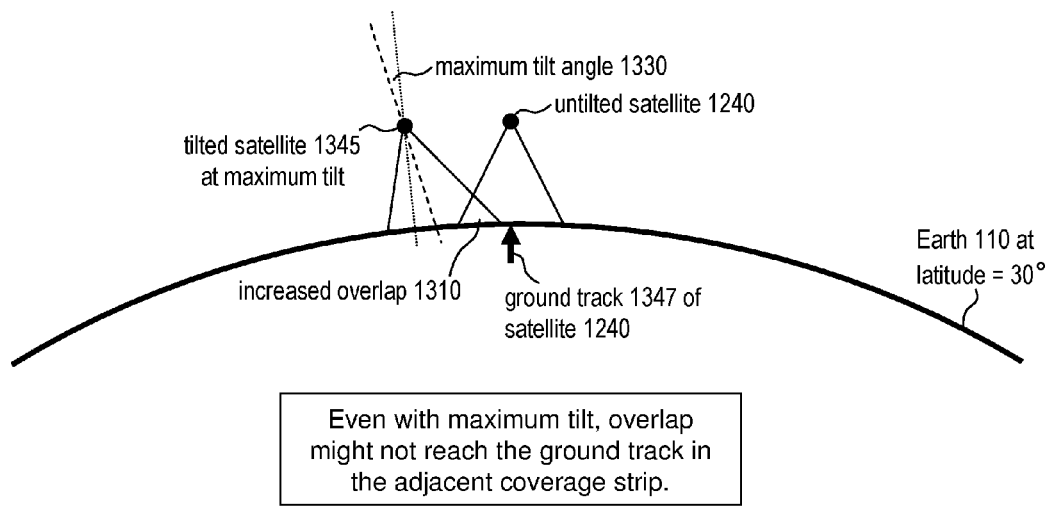
Even with maximum tilt, overlap might not reach the ground track in the adjacent coverage strip.

*FIG. 14* increased overlap at mid latitudes (e.g., latitude=40°)
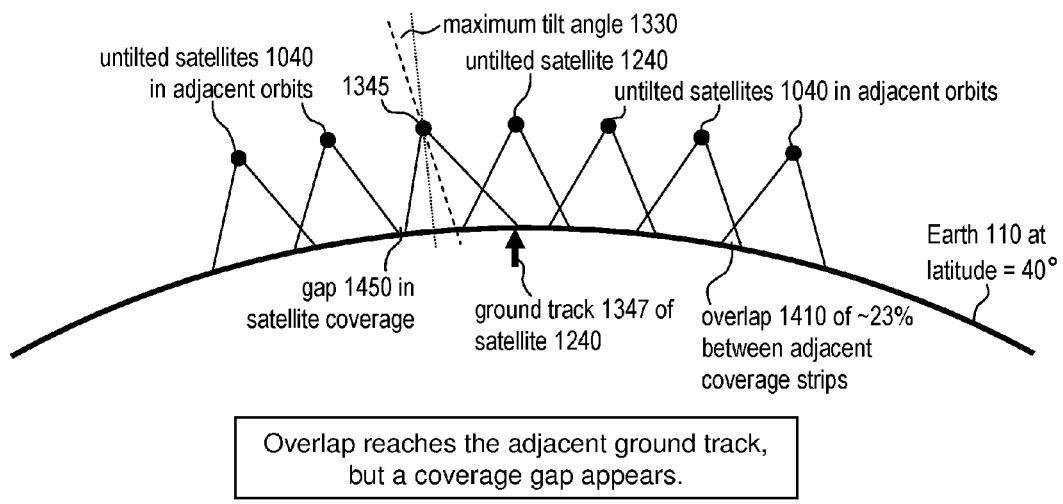
*FIG. 15* Progressive tilting of adjacent satellites
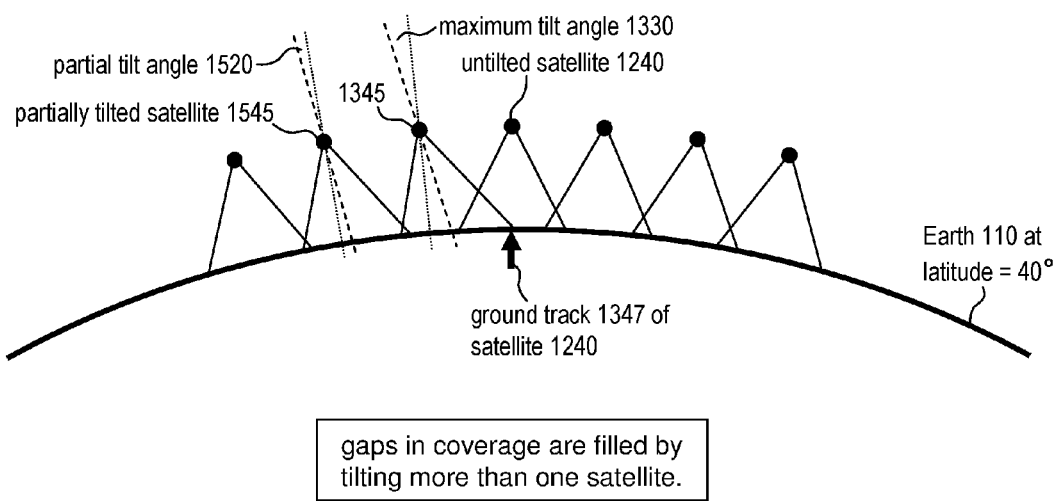

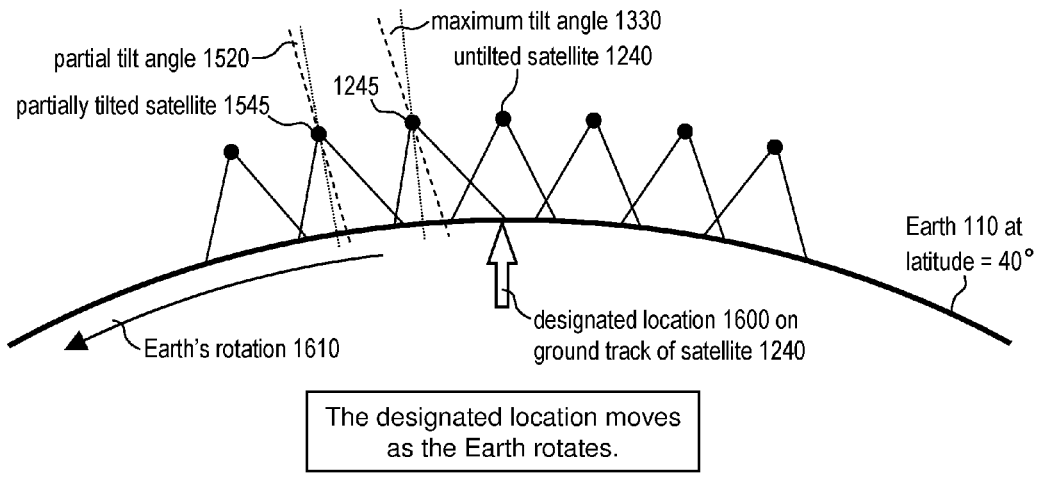
FIG. 16a  Continuous double coverage of a designated location – 1st view
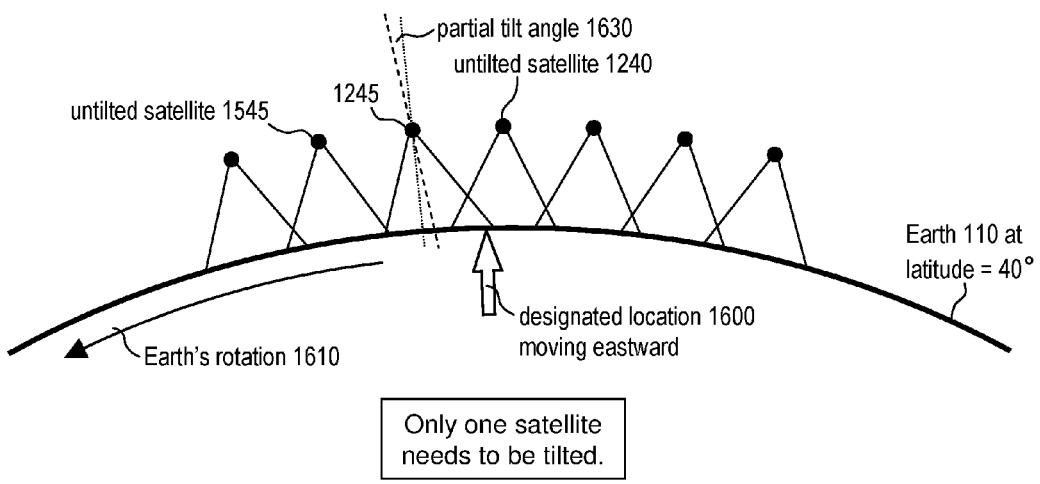
FIG. 16b  Continuous double coverage of a designated location – 2nd view FIG. 16c  Continuous double coverage of a designated location – 3rd view
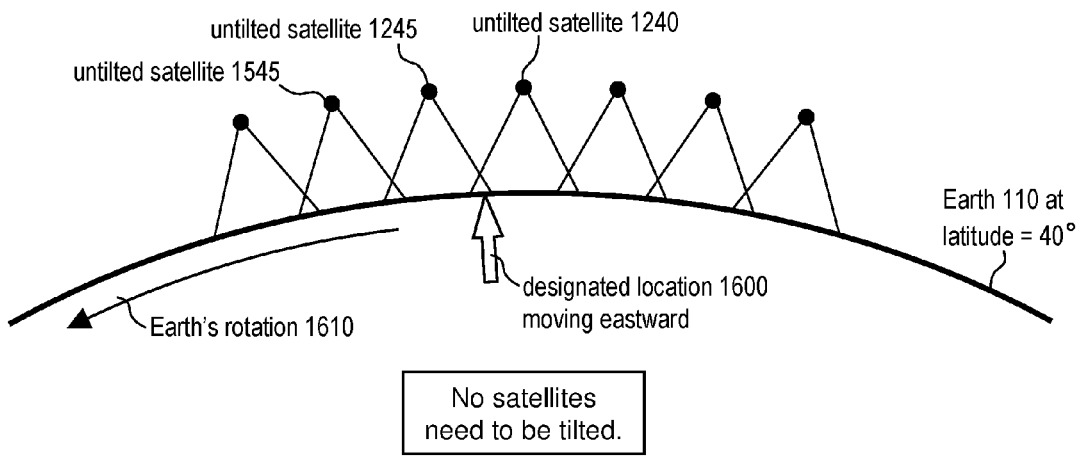
FIG. 16d  Continuous double coverage of a designated location – 4th view
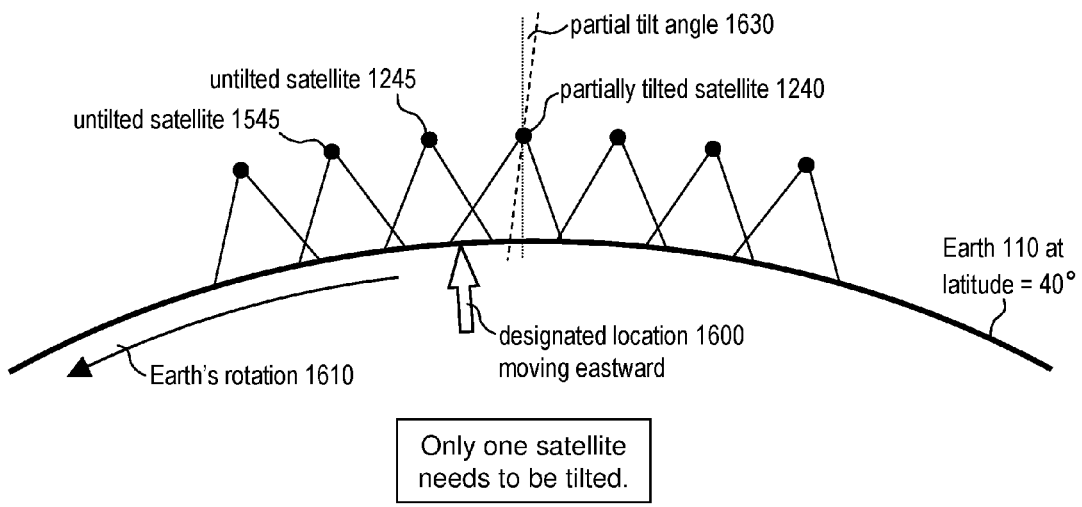

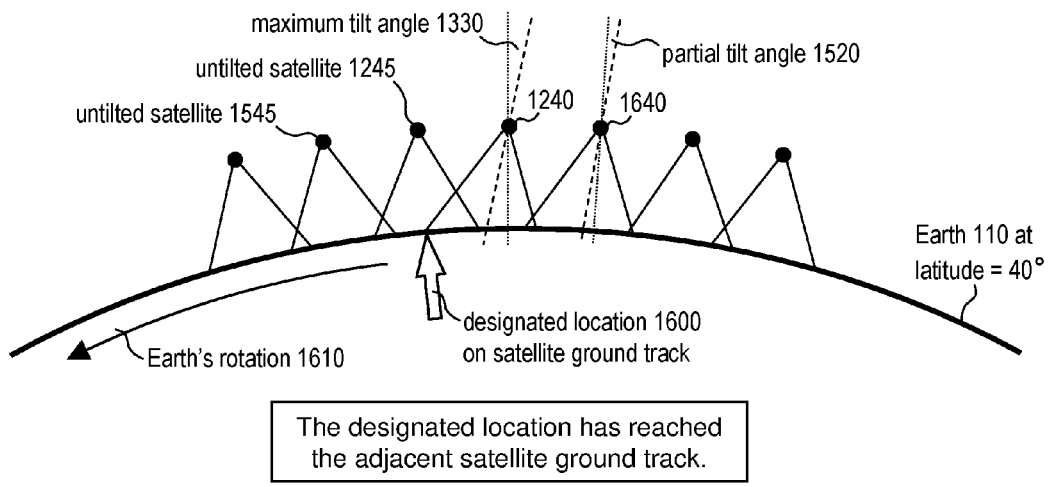
FIG. 16e  Continuous double coverage of a designated location – 5th view
The designated location has reached the adjacent satellite ground track.
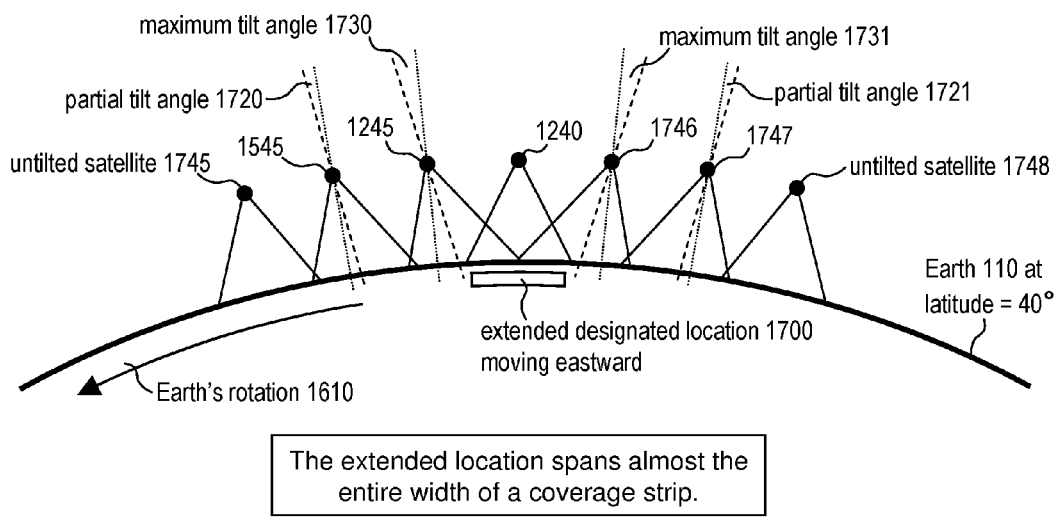
FIG. 17a  Continuous double coverage of a designated extended location – 1st view
The extended location spans almost the entire width of a coverage strip.

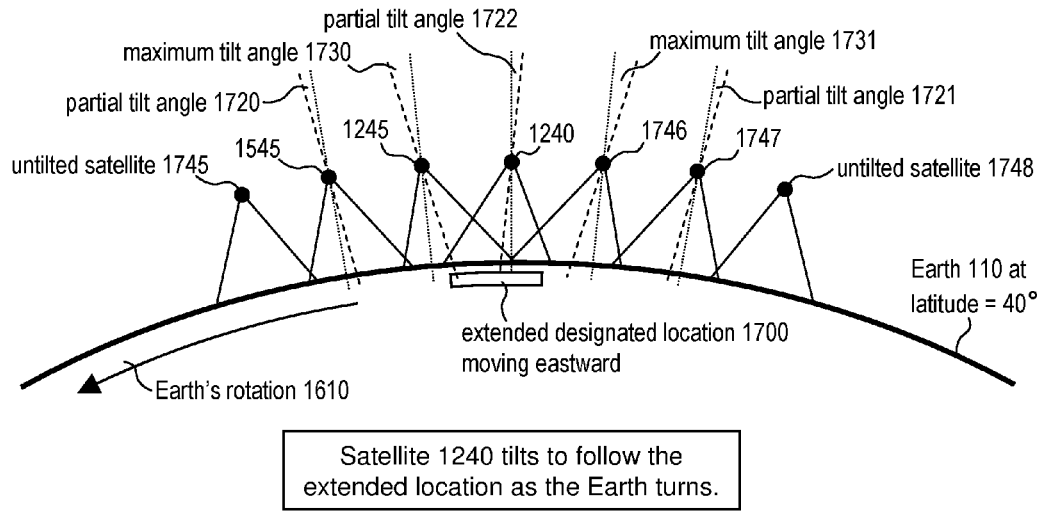
FIG. 17b  Continuous double coverage of a designated extended location – 2nd view
Satellite 1240 tilts to follow the extended location as the Earth turns.
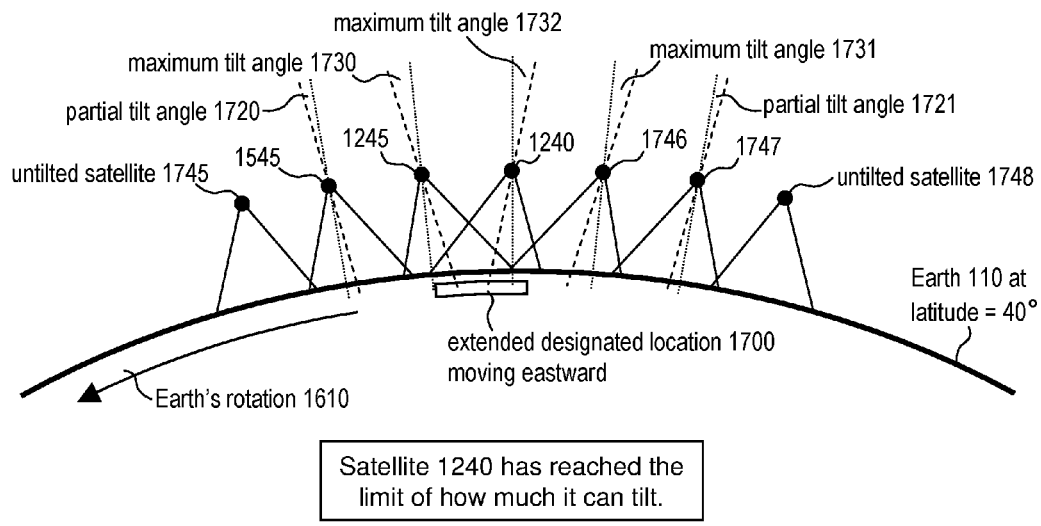
FIG. 17c  Continuous double coverage of a designated extended location – 3rd view
Satellite 1240 has reached the limit of how much it can tilt.

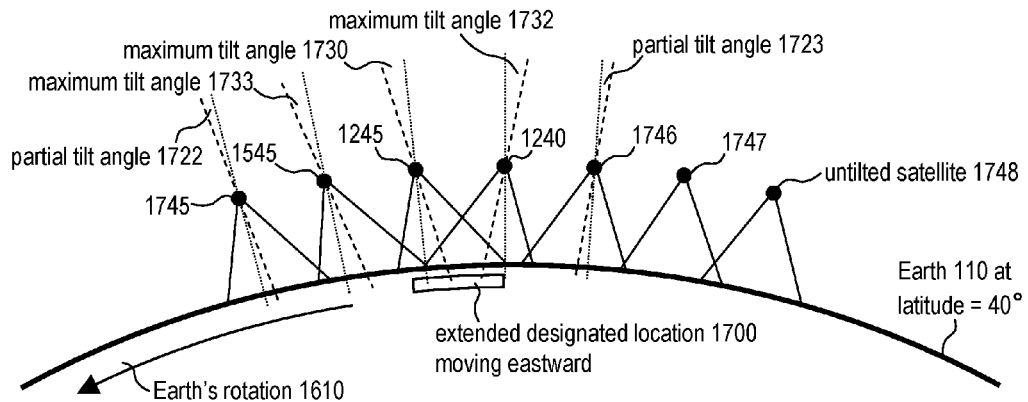
FIG. 17d  Continuous double coverage of a designated extended location – 4th view
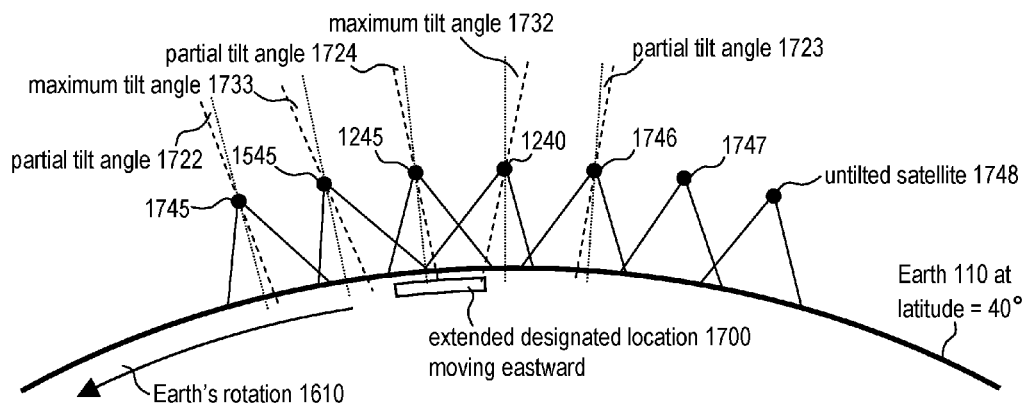
FIG. 17e  Continuous double coverage of a designated extended location – 5th view

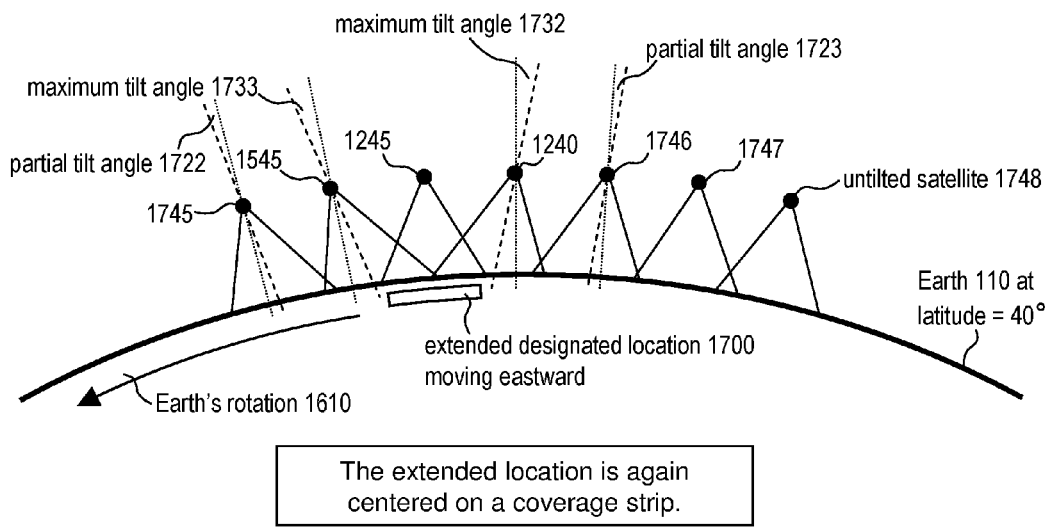
FIG. 17f  Continuous double coverage of a designated extended location – 6th view Coverage strip altered by satellite rotation maneuver

COMMUNICATION-SATELLITE SYSTEM WITH ENHANCED CAPACITY IN DESIGNATED LOCATIONS

FIELD OF THE INVENTION

The present invention relates to earth-orbiting communication satellites in general, and, more particularly, to systems of communication satellites in low earth orbit.

BACKGROUND

Ever since the beginning of the space age, communication satellites have been an important application of space technology. The first communication satellite was Telstar. At the time, it was an extraordinary technological achievement. It was designed, built and operated by Bell Telephone Laboratories, Holmdel, N.J., USA.

Communication satellites receive and transmit radio signals from and to the surface of the Earth for the purpose of providing communication services. With Telstar, which was the first and only communication satellite of its time, it was not possible to provide uninterrupted communication services to every location on the surface of the Earth. Only the few locations that happened to be within view of the satellite, at any given time, could transmit and/or receive radio signals to/from the satellite. In more modern communication-satellite systems, it is often desirable that every place on Earth be provided communication services at all times, a capability usually referred to as universal coverage. Furthermore, there are places and locations on Earth that require more communication capacity than others. For example, cities and other densely populated locations can be expected to require more communication capacity than locations in deserted areas.

For the purposes of this disclosure and the appended claims, the terms "place" and "location" have somewhat different meanings. Both terms refer to a portion of the surface of the Earth at a known position (latitude and longitude) relative to the Earth itself. However, the term "place" is understood to refer to something small enough to be effectively equivalent to a single point on the surface of the Earth, while a location can be of any size. For example, a small island, or a village, or a ship at sea can be referred to as a "place" but also as a "location"; in contrast, most countries in the world are too large to be referred to as a "place" and can only be referred to as a "location". It will be clear to those skilled in the art, after reading this disclosure, when a "location" can also be referred to as a "place".

Among the examples cited in the previous paragraph, the ship at sea underscores the fact that a "location" does not have to be at a fixed, immutable position on the surface of the Earth. Indeed, satellite-communication systems are particularly useful for providing communication services to non-fixed objects such as ships, aircraft, buses, automobiles, etc. Many techniques are well known in the art for measuring the position of a non-fixed object. For example, the Global Positioning System (GPS) can be used to measure the position of a ship at sea or other non-fixed object. If the position of an object on the surface of the Earth is known, it can be regarded as a "location" in accordance with the definition of the previous paragraph.

The goal of universal coverage via communication satellites can be accomplished with a satellite system based on low earth orbits (LEO). For the purposes of this disclosure and the appended claims, a satellite orbit shall be regarded as a LEO orbit if the satellite is always within 2,000 km of the surface of the Earth at all points in the orbit. An equivalent definition is that the altitude of the satellite above the surface of the Earth must not exceed 2,000 km.

A LEO orbit is called a "polar" orbit if it passes above or nearly above both poles. For the purposes of this disclosure and the appended claims, a LEO polar orbit is a LEO orbit whose ground track intersects both the Arctic and the Antarctic circles on the surface of the Earth. The polar caps encircled by the Arctic and Antarctic circles, respectively, are referred to as the "polar regions".

FIG. 1 depicts a possible LEO polar orbit 150 for a communication satellite, depicted as LEO satellite 140. FIG. 1 shows an outline of planet Earth 110, with outlines of continental masses clearly delineated. The positions of the North Pole 120 and the South Pole 130 are indicated by a straight line that represents the axis of rotation of the Earth. The orbit passes exactly above the two poles. The satellite travels along the orbit in the direction of motion 101 indicated by the arrow. With an orbit as depicted in FIG. 1, the satellite takes almost two hours to complete a full orbit.

FIG. 2 presents a more detailed depiction of the satellite and its relationship to the surface of the Earth below it. (In this detailed figure and in some of the subsequent figures, continental outlines on the surface of the Earth have been omitted to avoid visual clutter). The LEO satellite 140 is equipped with one or more radio antennas, depicted as radio antenna 210. The antennas transmit one or more radio signals toward the surface of the Earth 110. Such transmissions are shown in the figure as antenna beam 220. The radio transmissions can be received by Earth terminals that are located on the surface of the Earth within a coverage area depicted as coverage area 230. The satellite is also capable of receiving radio signals transmitted by the Earth terminals. For communication satellites, the radio signals can be used to support communication channels, thus providing bi-directional communication services to those Earth terminals. Conversely, Earth terminals that are located outside of the coverage area cannot receive strong-enough signals from the satellite, and their transmitted signals will not be received with adequate strength by the satellite.

For the purposes of this disclosure and the appended claims, the term "Earth terminal" refers to communication terminals operated by end users of the communication services provided by a communication-satellite system. In many such systems, the communication services provide connectivity with Earth-based networks such as the Internet. Therefore, satellites in such systems typically also have antennas for relaying communication channels to relay stations on the Earth that are connected with Earth-based networks. Such relay stations are typically operated by the operator of the communication-satellite system or its affiliates, and should not be regarded as "Earth terminals" for the purposes of this disclosure and the appended claims.

Radio antennas used for communication channels with Earth terminals are referred to as communication antennas in contrast to antennas used, for example, to support control channels or for communicating with relay stations. Earth terminals are devices located on or near the surface of the Earth (including, for example, on aircraft or ships at sea) that are capable of transmitting and receiving radio signals for communicating with communication satellites through the satellites' communication antennas.

For the purposes of this disclosure and the appended claims, the "coverage area" of a satellite is the portion of the surface of the Earth wherein Earth terminals can access communication services via the satellite through one or more of the satellite's communication antennas. The coverage area of a satellite moves on the surface of the Earth together with the satellite, as the satellite travels along its orbit. Typically, a satellite's coverage area is centered around the subsatellite point, depicted in FIG. 2 as subsatellite point 245. The subsatellite point is the point, on the surface of the Earth, nearest the satellite. From this point, the satellite appears exactly overhead, at the zenith. As the satellite travels along its orbit, the subsatellite point moves along with it. The path traced by the subsatellite point is known as the "ground track" traced by the satellite.

Although the coverage area is shown in FIG. 1 as having a circular shape, other shapes are also possible.

FIG. 3 depicts how a rectangular or quasi-rectangular shape for coverage areas can be advantageous. A quasi-rectangular shape allows efficient coverage of the surface of the Earth with no areas left uncovered and with only a modest amount of overlap between adjacent coverage areas. The figure shows quasi-rectangular coverage areas 301 through 306 arranged so as to provide such complete coverage with a modest amount of overlap.

FIG. 4 illustrates the relationship between a satellite's orbit and the satellite's ground track. LEO satellite 440 orbits the Earth in LEO polar orbit 450. As the satellite travels along its orbit, the subsatellite point 445 traces a path on the surface of the Earth. The path is depicted in FIG. 4 as ground track 447. Orbit 450 is a polar orbit in accordance with the definition provided earlier because ground track 447 passes well within the two arctic circles. In particular the orbital inclination of orbit 450, as depicted, is approximately 80°

In FIG. 4, the satellite's orbit is circular, and, accordingly, the satellite's ground track 447 is depicted as a great circle on the surface of the Earth. However, as already noted, the satellite needs almost two hours to complete a full orbit. During such period of time, the Earth rotates by almost 30°. Therefore, the depiction of continental outlines and gridlines on the surface of the Earth in FIG. 4 should be interpreted as just a snapshot of the Earth's position at a single point in time during that period of time. As the subsatellite point travels along the ground track, the Earth rotates at a steady rate such that the actual path traced by the subsatellite point on the surface of the Earth will not be a circle. When the satellite completes a full orbit and returns to the same point in the orbit, the subsatellite point will not be at the same place on the surface of the Earth.

In general, the subsatellite point will never return to the same exact place on the surface of the Earth unless the period of the orbit happens to have been chosen on purpose to achieve such a result. For example, the orbital period of GPS satellites was chosen such that the subsatellite point retraces the same ground track after about two orbits. To achieve this result for GPS satellites, the orbital period was carefully chosen to be almost the same as one half of a sidereal day. Its exact value was devised such that, even in the presence of orbital precession caused by tides and by the Earth's flattening at the poles, the GPS satellites retrace the same ground track after two full orbits.

In this figure and in the other figures in this disclosure where continental outlines and/or gridlines are depicted, it will be understood that such outlines and gridlines represent a snapshot of the Earth's position at a particular point in time, and that the Earth is actually rotating at all times. In such figures, patterns depicted on the surface of the Earth should be understood to be what they would be if the Earth were not rotating. It will be clear to those skilled in the art, after reading this disclosure, how to modify those patterns, if desired, to account for the Earth's rotation. The patterns depicted in this disclosure are best suited for illustrating the present invention and its embodiments.

In FIG. 4, the coverage area of satellite 440 is not depicted explicitly. However, from the depiction of FIG. 2 it is clear that only a small portion of the surface of the Earth below the satellite will enjoy communication services through the satellite at any given time. To achieve universal coverage, multiple satellites are required.

FIG. 5 shows how multiple satellites in the same orbit (i.e., co-orbiting) can provide continuous uninterrupted coverage to locations below the orbit (i.e., along and near the ground track). LEO polar orbit 150 is a circle, and twenty-four satellites 540 orbit the Earth in orbit 150. (In the figure, to avoid visual clutter, only five of the twenty-four satellites 540 are labeled explicitly.) The satellites are depicted as black dots. They are spaced uniformly along the orbit and, because the orbit is circular, they all move at the same speed at all times, such that the spacing between satellites remains constant. Each satellite provides communication services to a coverage area centered around its subsatellite point. Accordingly, in FIG. 5 there are twenty-four coverage areas 530. (In the figure, to avoid visual clutter, only four of the twenty-four coverage areas 530 are labeled explicitly.) It is advantageous if the coverage areas of the satellites have a quasi-rectangular shape as illustrated in FIG. 3 because adjacent coverage areas can provide continuous coverage with a modest amount of overlap.

FIG. 6 shows the twenty-four co-orbiting satellites 540 from a different viewpoint. The figure also shows the shape of the combined coverage provided by the satellites. It is depicted as coverage strip 647-1. It has the shape of a ribbon (hence the name "strip") that encircles the Earth, with the satellite ground track tracing the center line of the ribbon. (The individual coverage areas 530 are not shown explicitly). It is clear from FIG. 6 that coverage strip 647-1 covers only a portion of the surface of the Earth; therefore, in order to provide universal coverage, more satellites in more orbits are needed.

FIG. 7 depicts two distinct satellite orbits wherein both orbits are circular LEO polar orbits with the same shape, altitude and inclination. Kepler's laws dictate that the two orbits must intersect one another at two points. One of the intersection points is visible in the figure as intersection point 751 located near the North Pole. The other intersection point is near the South Pole and is hidden from view.

FIG. 8 depicts the coverage strips corresponding to the two orbits of FIG. 7. Coverage strip 647-1 corresponds to orbit 450 and is depicted with vertical hatching; coverage strip 647-2 corresponds to orbit 750 and is depicted with horizontal hatching. The angle between the two orbits was deliberately chosen such that the two coverage strips barely touch one another as they cross the Earth's Equator 810. However, at other latitudes, as the strips approach the polar regions, there is more and more overlap between the two strips. The area of overlap is depicted as area of overlap 860 with both vertical and horizontal hatching.

It is clear from the depiction of FIG. 8 that the addition of a second orbit expands overall coverage, but the covered area is not doubled because there is substantial overlap between the two coverage strips. The presence of overlap can be regarded as a waste of resources because, in the area of overlap, there are two satellites available at all times to provide redundant coverage. One might argue that such redundant coverage actually provides an opportunity to offer greater communication capacity to Earth terminals located in the area of overlap. Indeed, an Earth terminal located in that area could communicate with both satellites and thus enjoy double capacity, compared to communicating with only one satellite. Equivalently, two distinct Earth terminals in that area could communicate with two distinct satellites, such that each terminal enjoys the full capacity of one satellite, instead of having to share such capacity with the other terminal.

Unfortunately, such enhanced capacity is not as useful as might seem. This is so because of the Earth's rotation. As already noted above, the Earth is constantly rotating under the pattern of coverage strips. The outline of continents and gridlines shown in FIG. 8 is just a snapshot of the Earth's position at a particular point in time. The width of a coverage strip, as depicted in FIG. 8, is about 10°. It takes the Earth less than forty minutes to rotate by 10°. Therefore, a location that is in the area of overlap at some particular time might easily no longer be in that area a just a few minutes later. Such erratic availability of enhanced capacity is generally regarded as not being very useful. On the other hand, if it were possible to guarantee that a particular location will be in an area of overlap at all times, it would be then possible to take full advantage of the double capacity. Alternatively, it would also be useful if it were possible, for example, to schedule in advance, and on demand, that a particular location will be in an area of overlap at a particular desired time in the future. In such a case, the extra capacity available in the area of overlap could be utilized effectively and advantageously.

SUMMARY

Embodiments of the present invention are useful with communication-satellite systems based on LEO orbits. FIG. 9 depicts a system with eighteen LEO polar orbits and thirty-six satellites in each orbit, for a total of 648 satellites. The eighteen orbital planes are evenly spaced at increments of 10°. Embodiments of the present invention are based on the fact that the position on the surface of the Earth of a satellite's coverage area can be changed, within a limited range, without changing the position and trajectory of the satellite itself. In particular, in FIG. 2, the satellite's coverage area 230 is shown centered around the subsatellite point, as is customarily done in the art. However, the coverage area could easily be placed off center by simply changing the orientation of the satellite.

A satellite's orientation is controlled by the satellite's attitude control module, which comprises hardware and software for controlling and adjusting the orientation of the satellite. For example, an attitude control module might comprise a set of reaction wheels whose rate of rotation determines the rate of rotation of the satellite's body. The attitude control module can cause the satellite to rotate without changing the satellite's trajectory. In particular, it can cause the satellite to rotate about an axis parallel to its direction of motion along the orbit. Such axis is known in the art as the "roll" axis (as opposed to the "pitch" axis and the "yaw" axis).

In the English language, the verb "rotate" and its inflected forms ("rotating", "rotation", etc.) can be both transitive and intransitive. In this disclosure and the appended claims, both variants are used. For example, the verb is intransitive in "the Earth rotates" but it is a transitive verb in "the satellite is rotated by the attitude control module". It will be clear from context which variant is used at each occurrence.

When the satellite rotates, the orientation of the entire body of the satellite changes, including the orientation of the communication antennas, if they are rigidly affixed to the satellite's body. As a result of the rotation of the communication antennas, the position of the coverage area on the surface of the Earth will, in general, change. In particular, if the rotation is about the roll axis, the coverage area will move outside of the coverage strip depicted in FIG. 6. As a result, due to the rotation, the shape of the actual coverage strip will be altered, compared to the nominal shape depicted in FIG. 6. An example of how the shape might be altered in depicted in FIG. 18.

The altered shape of the coverage strip causes the position of areas of overlap with other coverage strips to change. Communication-satellite systems in accordance with embodiments of the present invention control the extent and timing of satellite rotations adaptively, as the Earth rotates, so as to cause the areas of overlap to be at designated locations on the surface of the Earth where enhanced communication capacity is desired.

BRIEF DESCRIPTION OF THE DRAWINGS

FIG. 10 depicts how the coverage strips of satellites in adjacent orbits provide full coverage without overlap at the Earth's Equator.

FIG. 11 depicts how the coverage strips of satellites in adjacent orbits have a small extent of overlap at a latitude of 30°.

FIG. 12 depicts how the extent of coverage-strip overlap can be increased by rotating satellites about their roll axis. In this disclosure, "tilt" is used as a synonym for "rotate"

FIG. 13 depicts how the increase in extent of coverage-strip overlap is limited by the maximum allowable satellite rotation (tilt).

FIG. 14 depicts how the extent of coverage-strip overlap is larger at latitudes further away from the Equator.

FIG. 15 depicts how it is possible to rotate satellites in multiple adjacent orbits to avoid coverage gaps.

FIGS. 16a through 16e depict a sequence of different combinations of satellite rotations that can be implemented to guarantee that a designated location on the surface of the Earth remains in an area of coverage-strip overlap at all times as the Earth rotates. In these figures, the designated location is of small extent.

FIGS. 17a through 17f depict a sequence of different combinations of satellite rotations that can be implemented to guarantee that a designated location on the surface of the Earth remains in an area of coverage-strip overlap at all times as the Earth rotates. In these figures, the designated location is of large extent.

DETAILED DESCRIPTION

Figure 1:
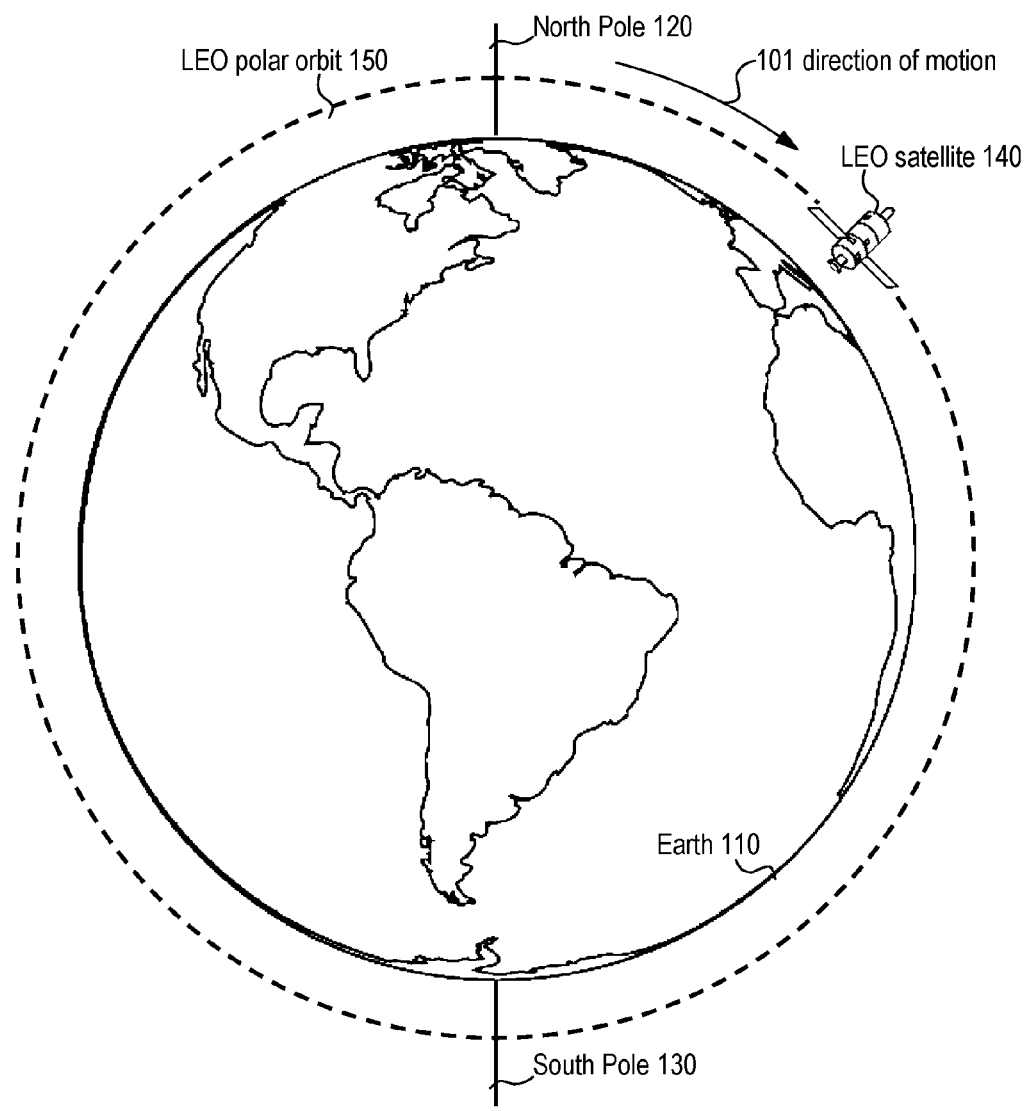
FIG. 1 depicts a communication satellite in LEO polar orbit in the prior art.
Figure 2:
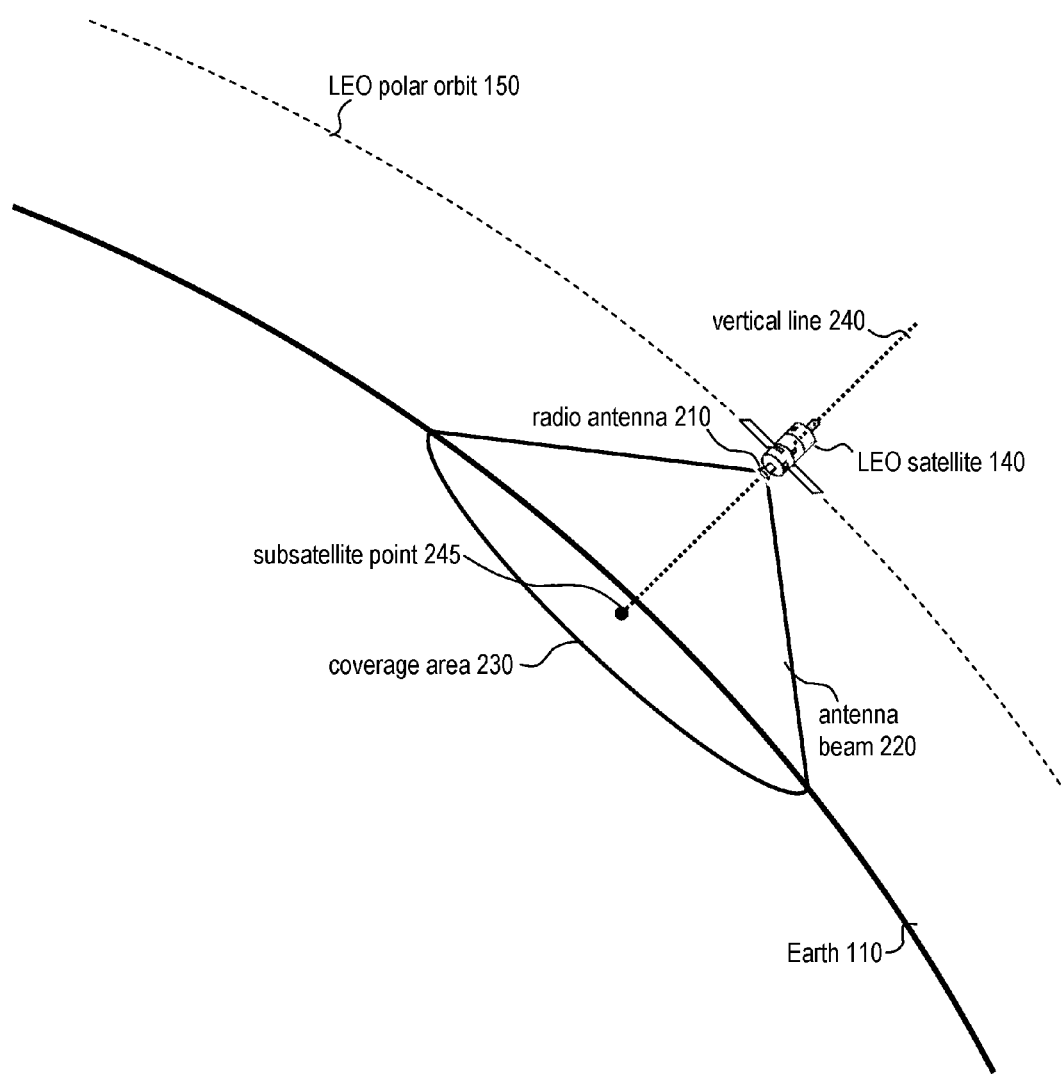
FIG. 2 illustrates the definitions of satellite coverage area and of subsatellite point in the prior art.
Figure 3:
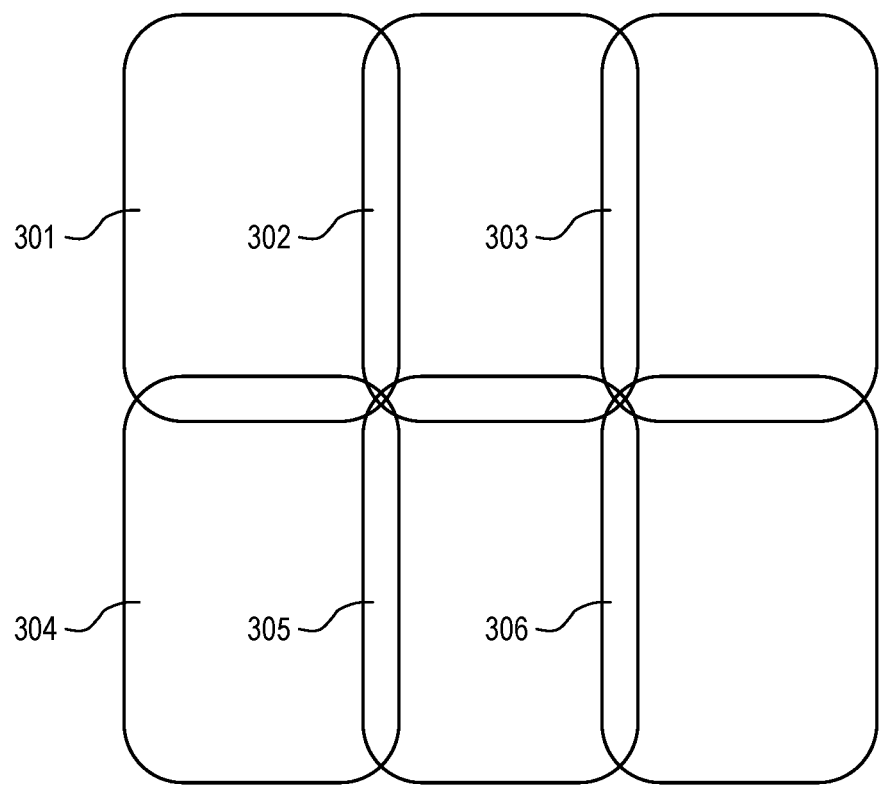
FIG. 3 illustrates how quasi-rectangular coverage areas can be effective at providing efficient coverage of the Earth's surface.
Figure 4:
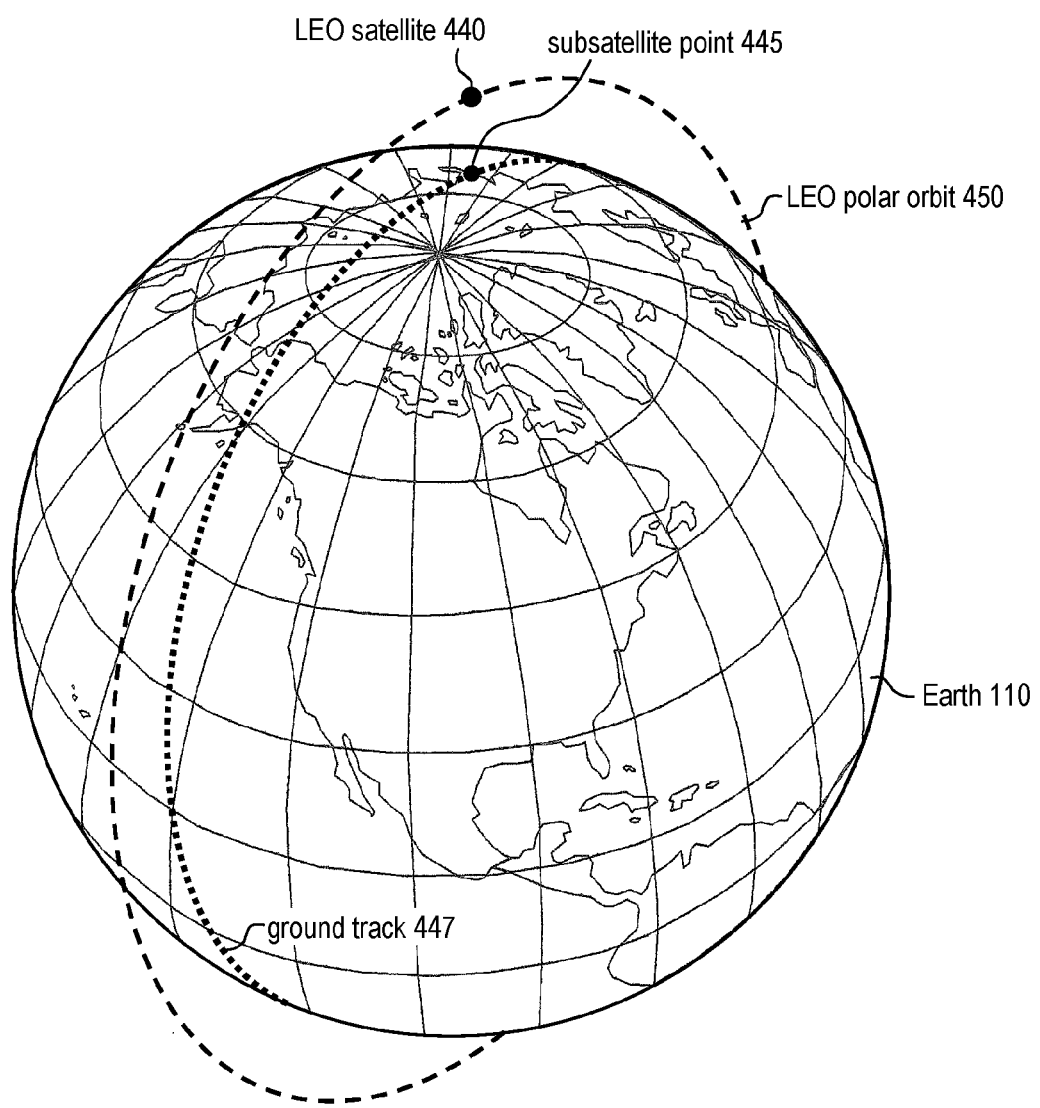
FIG. 4 illustrates the definition of satellite ground track in the prior art.
Figure 5:
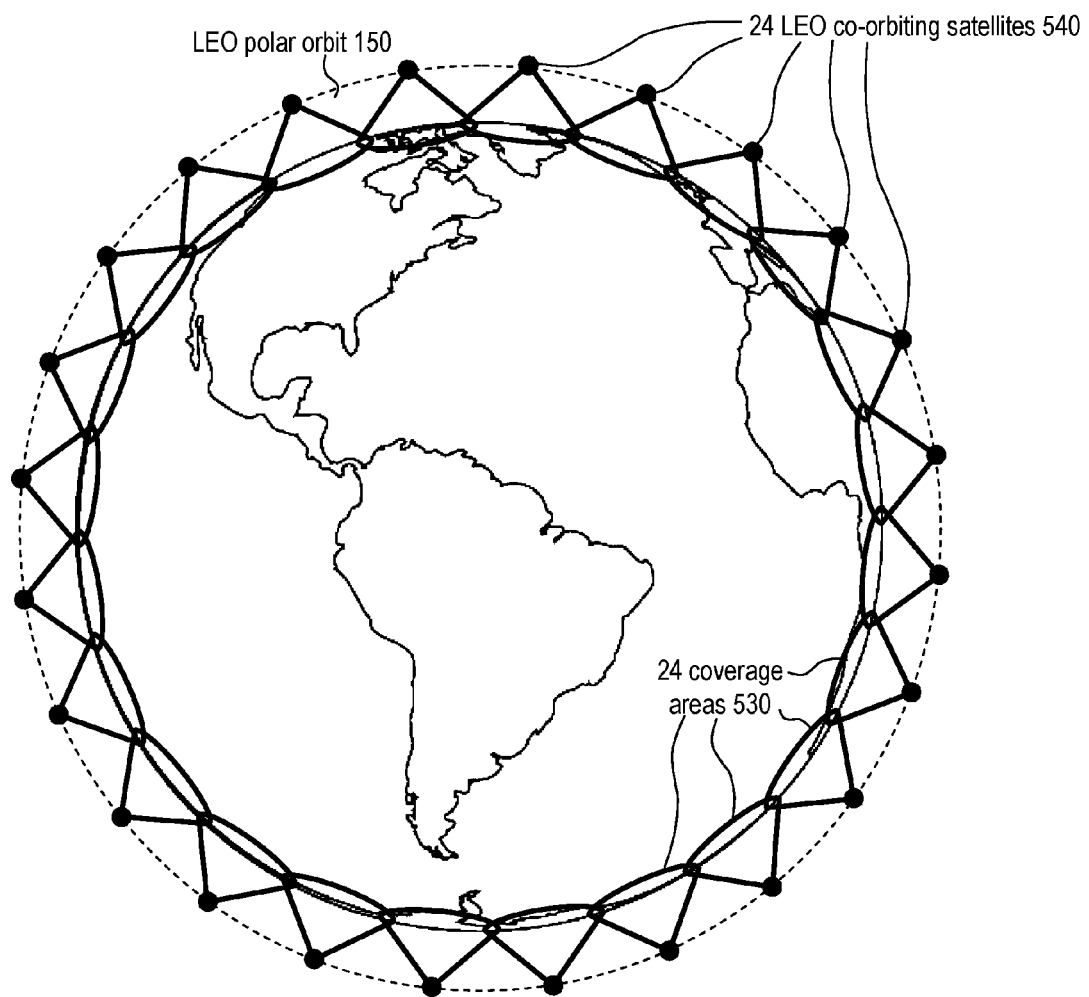
FIG. 5 depicts how multiple co-orbiting satellites can provide continuous coverage of locations on the Earth's surface that lie near the satellites' ground track in the prior art.

Embodiments of the present invention make it possible to designate certain locations on the surface of the Earth where it is desirable to have enhanced communication capacity. For some designated locations, it might be desirable to have enhanced capacity at all times; for others, it might be desirable to have enhanced capacity at certain times of day or on demand, for example, on the occasion of special events or occurrences.

In general, embodiments of the present invention can guarantee that a designated location will have double coverage over a predesignated interval of time. Such interval of time might be, for example a particular portion of the day that is repeated every day, or every business day, or any selection of days and times that is convenient to a particular end user at the designated location. Some end users might want the presdesignated interval of time to be a full 24 hours every single day for uninterrupted double coverage at all times.

Communication-satellite systems are particularly advantageous for providing communication services to locations where terrestrial communication systems are unavailable or difficult to access. A single communication satellite might have, for example, ten to twenty communication antennas, and each antenna might provide as much as several hundred Mbit/s of communication capacity. However, places on Earth where capacity is needed tend to be clustered together. For example, a small town in a remote area might benefit from communication access via satellite, but the small town is likely to be small enough to fit entirely within a single antenna beam. In such a situation, the total capacity available to such a small town is limited by the capacity of a single satellite antenna, if only one satellite is available.

A particularly notable example of this problem is provided by cruise ships on the high seas, for which satellites are the only practical means to communicate with the rest of the world. A modern cruise ship might have as many as six thousand passengers and more than two thousand crew members. If the capacity available to such a cruise ship is limited to the few hundred Mbit/s provided by a single satellite antenna, each person on board the ship has access to just a few tens of kbit/s, on average. Clearly, it would be of great benefit to double the capacity available to such a cruise ship.

Prior-art communication-satellite systems are typically structured to guarantee that every place on Earth is always within view of at least one satellite, so that connectivity for end users can be guaranteed to be available at all times. As discussed in the Background section, this means that many places on Earth will actually be within view of two or more satellites at any given time. Some places, especially near the poles, will enjoy such double coverage at all times. But, usually, those places are not where demand for enhanced capacity exists. Such demand is more likely to exist at mid latitudes, where a large portion of the human population lives.

Figure 8:
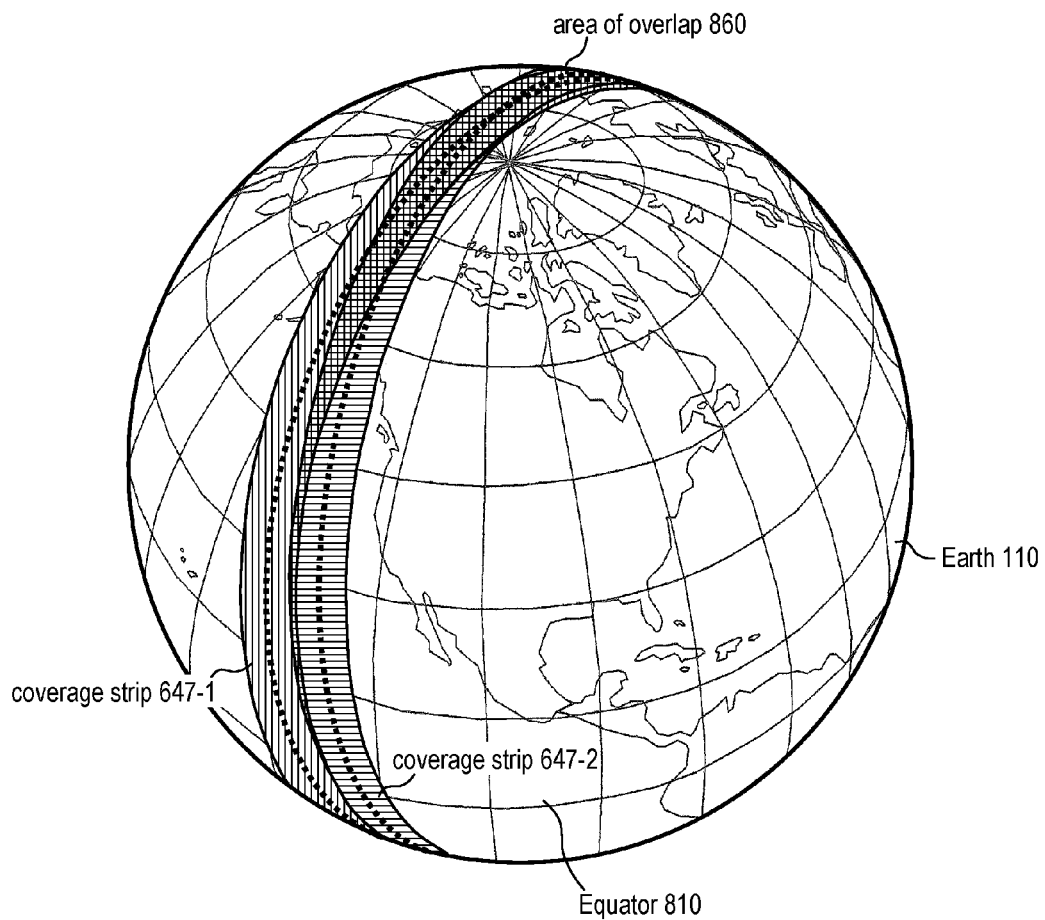
FIG. 8 shows the geometric relationship between adjacent coverage strips associated with adjacent orbits in the prior art.

It is clear from FIG. 8 that, at mid latitudes, there are substantial portions of the Earth's surface that enjoy double coverage at any given time, in prior-art systems. But prior-art systems cannot control when and where the double coverage is available. As a result, at any given time, there is a lot of double coverage available in areas where it is not needed; and areas where it is needed cannot be guaranteed to have it when they need it. In contrast, with embodiments of the present invention, it is possible to transfer double coverage from areas where it is available, but not needed, to areas where it is needed. All the while continuing to guarantee connectivity, with at least single coverage, everywhere.

Figure 7:
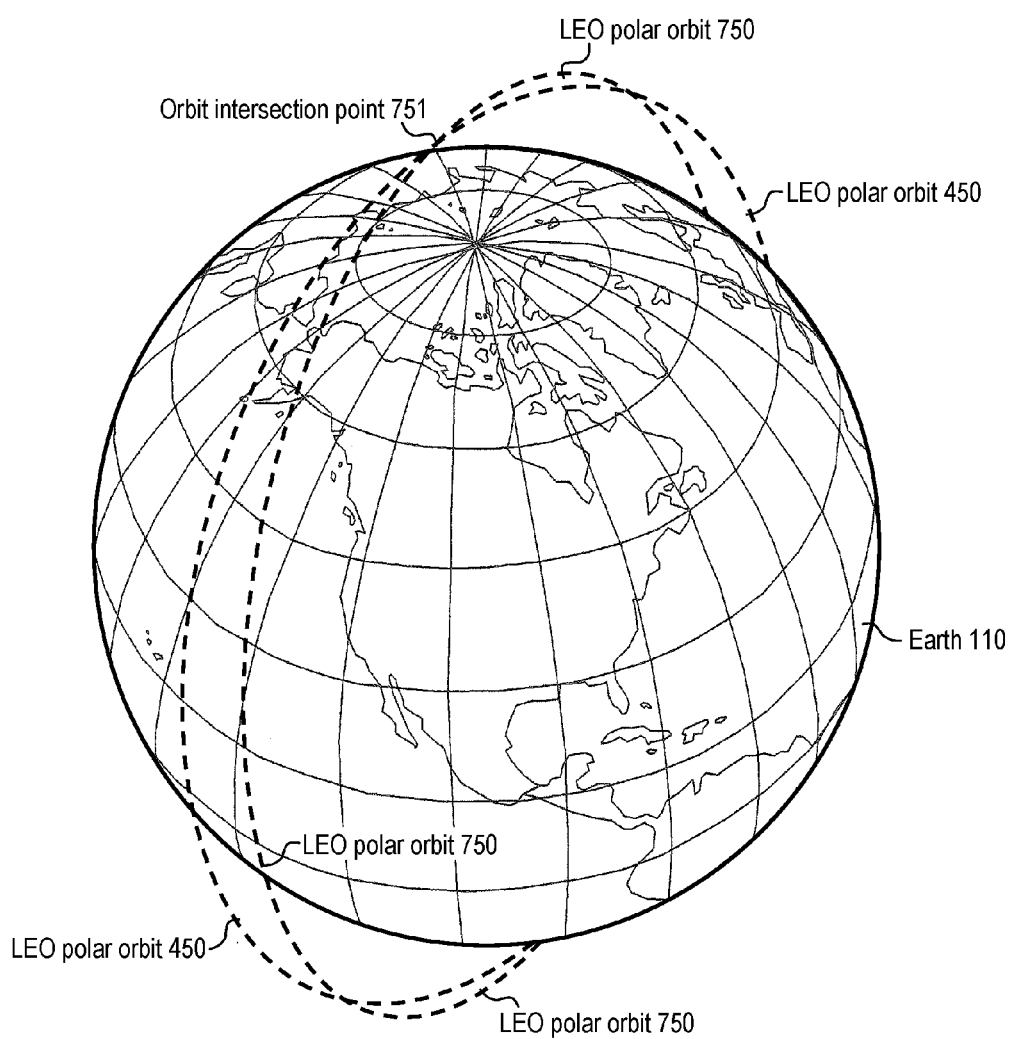
FIG. 7 illustrates how multiple satellite orbits are used in communication-satellite systems in the prior art to achieve universal coverage.

FIG. 10 is a diagram of satellite coverage at the Earth's Equator. The curved line 110 represents the surface of the Earth at the Equator as might be viewed for a position high above the North Pole. From this viewpoint, LEO polar orbits, such as those shown in FIG. 7, are lines that come out of the plane of the figure. FIG. 10 also shows seven LEO satellites 1040 in adjacent polar orbits. The satellites are depicted as black dots.

To avoid visual clutter in the figure, each satellite is depicted as having a single communication antenna. The corresponding antenna beams are depicted as antenna beams 220-1 through 220-7. Each antenna beam is shown to span the width of a corresponding coverage strip. There are seven coverage strips 647-1 through 647-7. As explained in conjunction with FIG. 8, the coverage strips provide full coverage without any overlap at the Equator, as is depicted in FIG. 10.

FIG. 11 is a diagram of satellite coverage at latitudes away from the Equator, but not as far as mid latitudes. The diagram of FIG. 11 is for a latitude of 30°. The diagram is valid for both a northern and a southern latitude of 30°. At such latitudes, there is some overlap between adjacent coverage strips, shown in the figure as overlap 1110, but the extent of the overlap is small. It is only about 12% at these latitudes. With such a small overlap it is difficult, (although not impossible) to implement embodiments of the present invention to transfer the double capacity available in the area of overlap from one place on Earth to another. Details are illustrated in the next few figures.

FIG. 12 illustrates a basic element of the techniques employed by embodiments of the present invention: satellite rotation, or "tilting". In this disclosure, the verb "tilt" is used as a shorter synonym of the verb "rotate". The shorter word is helpful in making the figures less cluttered and easier to understand. FIG. 12 depicts satellite 1245 as having rotated (tilted) about its roll axis so as to move its coverage area toward the west, i.e., toward satellite 1240, which is not tilted. The rotation of satellite 1245 has been accomplished via the satellite's attitude control module, which has rotated the satellite by the angle shown in FIG. 12 as tilt angle 1230.

In the figure, the vertical direction for satellite 1220 is shown by the dotted line vertical 1220, while the dashed line 1221 shows the axis of symmetry of the antenna beam. The point where the vertical 1220 meets the surface of the Earth is the subsatellite point, while the point where the dashed line 1221 meets the surface of the Earth is the approximate center of the coverage area of satellite 1245. The two lines coincide for an untilted satellite, and, for a tilted satellite, the angle between the two lines is the angle by which the satellite has been tilted, compared to the nominal satellite orientation.

The diagram of FIG. 12 shows that satellite tilting increases the extent of overlap between the coverage area of satellite 1245 and the coverage area of satellite 1240. The increase comes at the cost of a decrease in the extent of overlap with the adjacent coverage strip on the other side of satellite 1245 (not shown in FIG. 12). In this sense, satellite tilting can be viewed as a technique for transferring overlap, and the associated double capacity, from one location to another.

FIG. 13 illustrates a limit to how much overlap can be transferred via satellite tilting. The angle by which a satellite can be tilted is not unlimited, for a variety of reasons. For example, there might be a lower limit to the allowable elevation of a satellite above the horizon, as seen by an Earth terminal. A consequence of such an elevation limit is a limit on satellite tilting because, if a satellite is tilted too much, Earth terminals near the edge of the coverage area might see the satellite too low above the horizon. Also, distance between an Earth terminal and the satellite might be required to be no larger than a maximum allowable value, which also results in a tilt limit. For these and other reasons, there will be a maximum allowable tilt angle in many embodiments of the invention.

Figure 6:
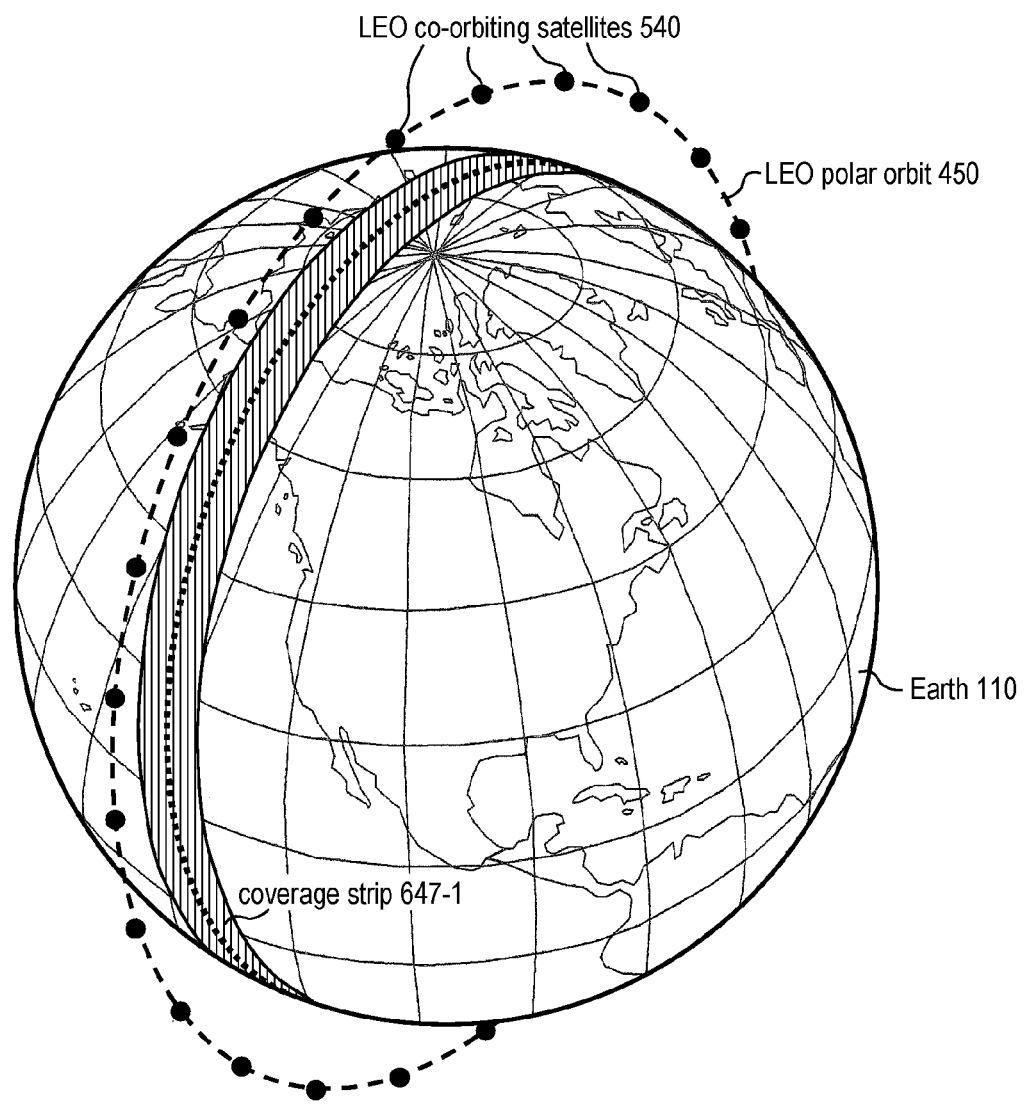
FIG. 6 illustrates how the coverage areas of multiple co-orbiting satellites combine into a single coverage strip in the prior art.

The diagram of FIG. 13 shows what happens when a satellite is tilted by the maximum amount. Satellite 1345 is at maximum tilt, having tilted by maximum tilt angle 1330. The extent of increased overlap 1310 is at its maximum possible value, for this latitude. Unfortunately, in the illustrative diagram of FIG. 13, this is not enough for the edge of the tilted coverage area of satellite 1345 to reach the center line of the adjacent coverage strip, whose position is indicated in the figure by an arrow. The arrow is labeled "ground track 1347 of satellite 1240" because that ground track is the center line of the adjacent coverage strip, as illustrated in FIG. 6.

There is an important consequence to the fact that the maximum reach of the coverage area of tilted satellite 1345 does not go as far as the arrow in FIG. 13: a place on Earth that happens to be at that arrow's position won't be able have double capacity. Therefore, at these latitudes, embodiments of the present invention cannot unconditionally guarantee double capacity to a designated location because, as the Earth rotates, that location might, at some point, be on the center line of a coverage strip and no satellites in adjacent orbits will be able to tilt sufficiently far to reach it. To enable such unconditionally guaranteed double capacity, maximum tilt angle can, for example, be increased, or the width of coverage strips can be increased to the point where, even at the Equator, there is some overlap between adjacent coverage strips. It will be clear to those skilled in the art, after reading this disclosure, when and how much to increase the width of coverage strips or the maximum tilt angle in order to be able to implement embodiments of the present invention at a desired latitude.

FIG. 14 illustrates how satellite tilting becomes effective, at higher latitudes, for transferring double capacity unconditionally to any location. The diagram of FIG. 14 is for a latitude of 40°, north or south of the Equator. At these latitudes, the overlap between adjacent coverage strips is about 23% and, in the depiction of FIG. 14, the maximum allowed tilt angle is large enough that any designated place on Earth can be unconditionally provided double capacity via satellite tilting. This is illustrated in FIG. 14 by satellite 1345, which is tilted at the maximum allowed tilt angle 1330. The edge of its coverage area reaches as far as the ground track 1347 of satellite 1240, denoted by the arrow. With this tilt angle, a place at the arrow will enjoy double capacity. For places that are closer to satellite 1345 than the arrow, a lesser tilt angle will be sufficient to provide them with double capacity.

The figure shows, however, that a gap 1450 in satellite coverage appears between satellite 1345 and the adjacent coverage strip on the side opposite the arrow. That can be dealt with by tilting an additional satellite, as shown in the next figure.

FIG. 15 shows how the gap 1450 can be eliminated via progressive tilting of adjacent satellites. In the figure, satellite 1545 is tilted by an angle less than the maximum allowed. The angle is just enough that the gap 1450 becomes covered by the coverage area of satellite 1545 without an additional gap appearing elsewhere. However, it will be clear to those skilled in the art, after reading this disclosure, how to progressively tilt additional satellites, if necessary, to cover other gaps that might appear.

FIGS. 16a through 16e depict a sequence of different combinations of satellite tilts that can be implemented to guarantee that a designated location 1600 on the surface of the Earth, at mid latitudes, enjoys double capacity at all times as the Earth rotates. In these figures, the designated location is small enough that it can be regarded as a single place on Earth whose position is indicated by the white arrow in the figures.

The sequence begins with FIG. 16a, wherein the designated location is on the center line of the coverage strip of satellite 1240. The combination of satellite tilts that achieves double capacity for this position of the designated location is, of course, the combination that was already depicted in FIG. 15. In the subsequent figures, as the Earth rotates, the position of the designated location indicated by the white arrow will move toward the left, in the direction indicated by the black arrow Earth's rotation 1610.

In FIG. 16b, the designated location has moved by a couple of degrees of longitude. It is now closer to satellite 1245 and, as a result, satellite 1245 does not need to tilt as much as before to provide the designated location with double capacity. Also, the reduced tilt of satellite 1245 means that it is no longer necessary to tilt satellite 1545 for the purpose of covering a gap.

In FIG. 16c, the designated location has moved further and is now in the area of overlap that occurs between adjacent coverage strips, at these latitudes, even without any satellite tilting. No satellite tilting is needed to provide double capacity to the designated location in this figure.

In FIG. 16d, as the Earth keeps rotating, the designated location has now reached the point where satellite 1240 needs to be tilted in order to keep providing double capacity to the designated location. No other satellites need to be tilted yet. The diagram of FIG. 16d looks like a mirror image of the diagram of FIG. 16b.

In FIG. 16e, the designated location has reached the center line of the coverage strip of satellite 1245. The diagram of FIG. 16e looks like a mirror image of the diagram of FIG. 16a. Because the designated location is now on the center line of a coverage strip, satellite 1240 must be tilted by the maximum angle, and satellite 1640 must also be tilted to cover the gap in coverage that would otherwise appear.

As the designated location keeps moving with the rotation of the Earth, the sequence of FIGS. 16a through 16e can now be repeated with the new starting point on the center line of the coverage strip of satellite 1245.

FIGS. 16a through 16e are for a location on Earth that is small enough to be regarded as a single place, but, some-times, it is desirable to provide double capacity to a location that has a wider extent, such as, for example, a very large city or a small country.

FIGS. 17a through 17f depict a sequence of combinations of satellite tilts for guaranteeing double capacity at all times to a location whose extent is almost as wide as a full coverage strip. Of course, compared to the sequence of FIGS. 16a through 16e, more satellites need to be tilted to guarantee double capacity to such a large location. In the figures, the extended location to be covered is depicted as a white rectangle 1700 that is almost as wide as a coverage strip.

The sequence begins with FIG. 17a, wherein the designated location is centered in the coverage strip of satellite 1240. To provide double capacity to the entire width of the designated location, satellites 1245 and 1746 on both sides need to be tilted. Furthermore, progressive tilting of the next two satellites 1545 and 1747 is also needed to prevent the appearance of coverage gaps.

In FIG. 17b, the designated location has moved by a couple of degrees of longitude. Satellites 1545, 1245, 1746, and 1747 need to retain their tilt angles, but now even satellite 1240 needs to start tilting, so that its coverage area follows extended location 1700 as the Earth turns.

In FIG. 17c, the tilt angle of satellite 1240 has reached the allowed maximum and cannot tilt any further. To continue providing double capacity to location 1700 as the Earth keeps turning, some other satellite needs to start tilting. This is shown in the next figure.

In FIG. 17d, satellite 1545 has now tilted by the maximum angle, so that the edge of its coverage area has reached the center line of the coverage strip below satellite 1245, to meet the edge of the coverage area of satellite 1240. This way, extended location 1700 can continue to enjoy double capacity. In the meantime, the western edge of extended location 1700 is still near the center line of the coverage strip below satellite 1240, such that satellite 1245 needs to remain at maximum tilt. However, satellite 1746 can now reduce its tilt angle because it only needs to cover the gap that would otherwise appear if it were to reduce its tilt angle to zero. The diagram of FIG. 17d looks like a mirror image of the diagram of FIG. 17c.

In FIG. 17e, as the Earth keeps rotating, satellites 1745, 1545, 1240, and 1746, need to retain their tilt angles while satellite 1245 needs to keep changing its tilt angle so that its coverage area follows extended location 1700 as the Earth turns. The diagram of FIG. 17e looks like a mirror image of the diagram of FIG. 17b.

In FIG. 17f, the designated location 1700 is now centered in the coverage strip of satellite 1245. The diagram of FIG. 17f looks like a mirror image of the diagram of FIG. 17a, and the sequence is now complete. As the designated location keeps moving with the rotation of the Earth, the sequence of FIGS. 17a through 17f can now be repeated with the new starting point in the coverage strip of satellite 1245.

In the diagrams of FIGS. 16a through 16e and 17a through 17f, the same satellite designations are used in consecutive figures for clarity of explanation. However, those skilled in the art will note that, in the time it takes for the Earth to rotate as shown in the sequence of figures, different satellites will actually be present in the positions marked by the black dots in different diagrams. Repeated satellite designations in these figures should be interpreted to refer to satellites in the same orbits, as opposed to a literal interpretation as referring to the same physical satellites. For example, when the discussion of FIG. 17b states that "satellites 1545, 1245, 1746, and 1747 need to retain their tilt angle", the statement should not be interpreted to mean that some physical satellites should remain tilted at a constant tilt angle during the time interval spanned by FIGS. 17a and 17b. Rather, as satellites in those four orbits approach the latitude of 40° during that time interval, they need to start rotating so as to have the prescribed tilt angles shown in the diagram by the time they reach the latitude of 40°. As they leave the latitude of 40°, they can rotate back to their nominal orientation or, perhaps, start rotating to a new tilt angle that might be needed for supporting another designated location at a different latitude. The statement about satellites retaining their tilt angles should be understood to mean that the prescribed tilt angles for satellites in those orbits at that latitude do not change over the time interval between the two figures.

Figure 18:
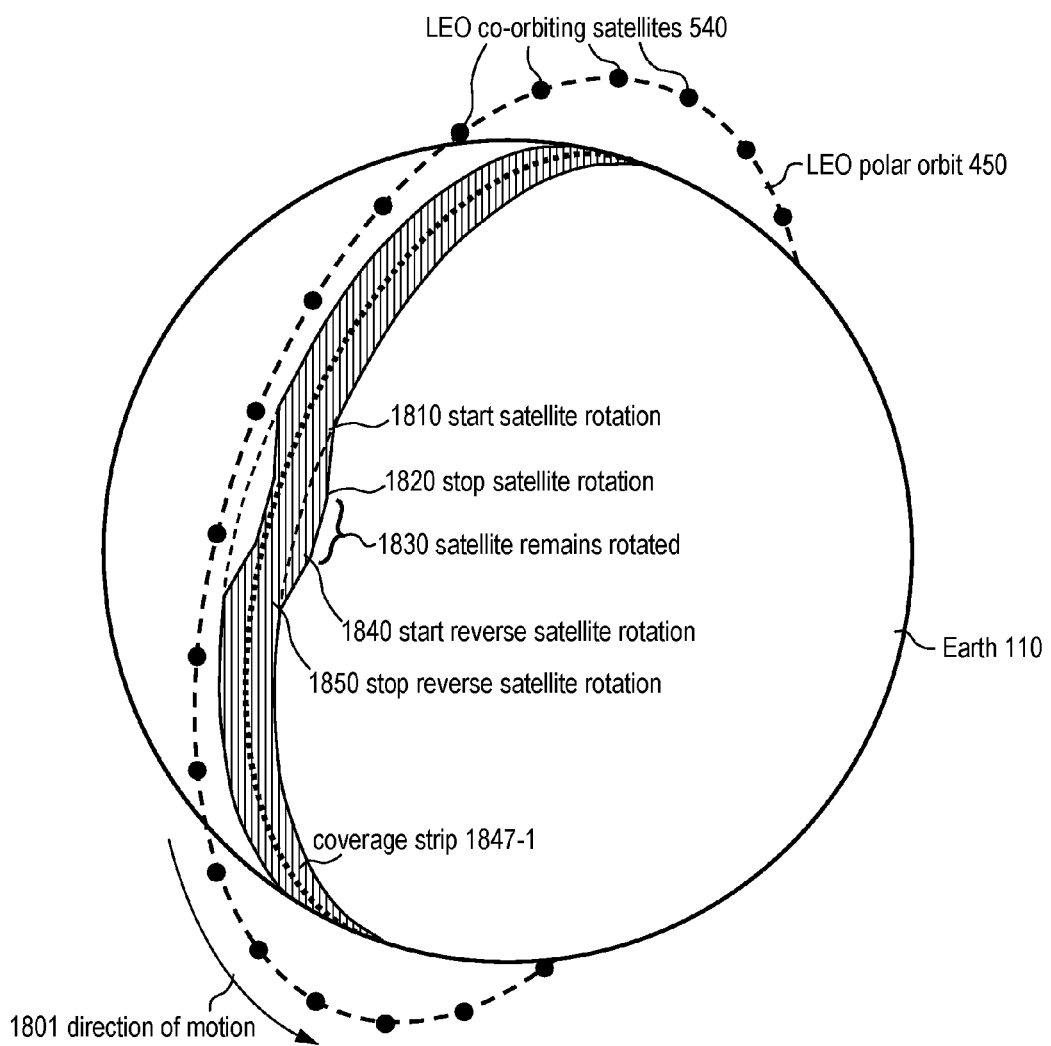
FIG. 18 depicts the geometric shape of a coverage strip that has been altered by implementing satellite rotations at certain points in the satellites' orbit.

FIG. 18 shows what happens as satellites in a particular orbit approach a particular latitude at a point where a particular tilt is needed. FIG. 18 is derived from FIG. 6, but continental outlines and gridlines are not depicted in this figure in order to reduce visual clutter. The direction of motion of the co-orbiting satellites is indicated by arrow 1801. When the attitude control module of a satellite needs to rotate the satellite, the rotation cannot be instantaneous. Therefore, the rotation needs to be started prior to the satellite reaching the range of latitudes where a particular tilt angle is needed.

In FIG. 18, the point where a satellite rotation starts is shown as 1810. The rotation is complete when the satellite reaches 1820, and the tilt angle is then retained through the range of latitudes 1830. Thereafter, the satellite's attitude control module implements a rotation that is the reverse of the rotation started at 1810, such that, between 1840 and 1850, the satellite returns to its nominal orientation.

All the co-orbiting satellites perform the maneuvers described in the previous paragraph when they pass above locations 1810, 1820, 1840, and 1850. As a result, the shape of the actual coverage strip implemented by the co-orbiting satellites of FIG. 18 is different form the nominal shape of a coverage strip depicted in FIG. 6. That nominal shape is outlined in FIG. 18 by dashed lines. The actual shape is shown by the vertical hatching. In the previous paragraphs and figures, references to a satellite's coverage strip always were to the satellite's nominal coverage strip; of course, the tilting maneuvers illustrated in the paragraphs and figures resulted in actual coverage strips different form nominal as illustrated in FIG. 18.

The shape of an actual coverage strip evolves only slowly, as the Earth rotates and as the tilt angles needed at a particular latitude change as the designated area moves. In the meantime, the co-orbiting satellites that generate the coverage strip move at a much faster speed than the designated area. The shape of the coverage strip remains stable because all the satellites start rotating at the same point in the orbit; that is, when they pass above location 1810, which can, therefore, be regarded as a "trigger" location that triggers the start of satellite rotations.

Figure 9:
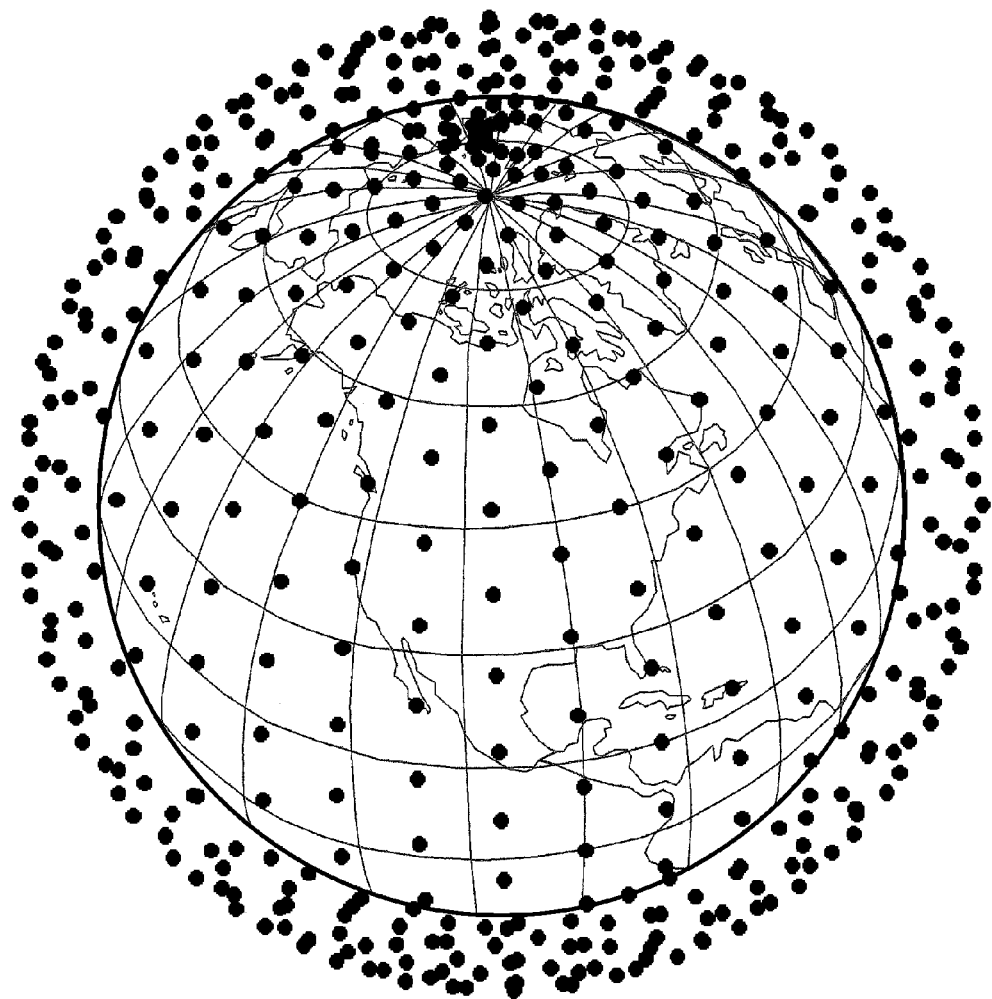
FIG. 9 depicts a snapshot of a communication-satellite system that might utilize an embodiment of the present invention. The system has 648 satellites arranged in 18 LEO polar orbits in evenly-spaced orbital planes, each with 36 co-orbiting satellites uniformly distributed along the orbit. The satellites are depicted as black dots.

Although FIGS. 10 through 17f depict satellites in adjacent orbits as crossing the same latitudes at the same time, it will be clear to those skilled in the art, after reading this disclosure, that such synchronization of satellites is not required for the successful implementation of embodiments of the present invention. Indeed, for example, in the satellite system depicted in FIG. 9 satellites in adjacent orbits do not cross the same latitudes at the same times. The altered shape of the actual coverage strip depicted in FIG. 18 does not depend on the timing of satellites 540 relative to satellites in adjacent orbits. It will be clear to those skilled in the art, after reading this disclosure, how to adjust the exact values of the tilt angles depicted in FIGS. 10 through 17f as needed to accommodate a particular relative timing between satellites in adjacent orbits.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

What is claimed:

1. A system of communication satellites in low earth orbits, the system comprising a plurality of communication satellites in low earth orbits, the plurality including at least a first satellite and a second satellite that orbit the Earth in two distinct orbits, each satellite comprising:
   one or more communication antennas that provide communication services to a coverage area of the satellite, said coverage area being a portion of the surface of the Earth wherein Earth terminals can access communication services via the satellite; and
   an attitude control module for rotating the satellite about a roll axis thereof, wherein the attitude control module of the first satellite causes same:
   (a) rotate about the roll axis thereof by a first angle when the first satellite passes above a first trigger location on the surface of the Earth, thereby placing the first satellite in a first rotated orientation, and
   (b) remain in the first rotated orientation during a coverage time interval, such that the coverage area of the first satellite and the coverage area of the second satellite overlap, at least in part, during the coverage time interval, wherein a designated location on the surface of the Earth remains within the part where the coverage areas overlap during the coverage time interval.

2. The system of communication satellites of claim 1 wherein at least two satellite coverage areas overlap over the designated location every day during a predesignated portion of the day.

3. The system of communication satellites of claim 2 wherein the planes of the two orbits intersect one another along a line that crosses the surface of the Earth in a polar region.

4. The system of communication satellites of claim 2 wherein the designated location comprises a portion of the ground track traced by the second satellite during the coverage time interval.

5. The system of communication satellites of claim 2 wherein the attitude control module of the second satellite causes same to:
   (a) rotate about the roll axis thereof by a second angle when the second satellite passes above a second trigger location on the surface of the Earth, thereby placing the second satellite in a second rotated orientation, and
   (b) remain in the second rotated orientation during the coverage time interval, such that the size of the part where the coverage areas overlap becomes relatively larger.

6. The system of communication satellites of claim 2 wherein the plurality of communication satellites further comprises a third satellite having an orbit that is distinct from that of the first satellite and the second satellite, the third satellite comprising:
   one or more communication antennas far that provide communication services to a coverage area of the third satellite,
   an attitude control module for rotating the third satellite about a roll axis thereof and that causes same to:
   (a) rotate about the roll axis thereof by a third angle when the third satellite passes above a third trigger location on the surface of the Earth, thereby placing the third satellite in a third rotated orientation, and
   (b) remain in the third rotated orientation during the coverage time interval, such that an omitted location on the surface of the Earth is within the coverage area of the third satellite during the coverage time interval, wherein the omitted location would have been within the coverage area of the first satellite during the coverage time interval, but for the fact that the first satellite remains in the first rotated orientation during the coverage time interval.

7. The system of communication satellites of claim 1 wherein the planes of the two orbits intersect one another along a line that crosses the surface of the Earth in a polar region.

8. The system of communication satellites of claim 1 wherein the designated location comprises a portion of the ground track traced by the second satellite during the coverage time interval.

9. The system of communication satellites of claim 1 wherein the attitude control module of the second satellite causes same to:
   (a) rotate about the roll axis thereof by a second angle when the second satellite passes above a second trigger location on the surface of the Earth, thereby placing the second satellite in a second rotated orientation, and
   (b) remain in the second rotated orientation during the coverage time interval, such that the size of the part where the coverage areas overlap becomes relatively larger.

10. The system of communication satellites of claim 1 wherein the plurality of communication satellites further comprises a third satellite having an orbit that is distinct from that of the first satellite and the second satellite, the third satellite comprising:
    one or more communication antennas far that provide communication services to a coverage area of the third satellite,
    an attitude control module for rotating the third satellite about a roll axis thereof and that causes same to:
    (a) rotate about the roll axis thereof by a third angle when the third satellite passes above a third trigger location on the surface of the Earth, thereby placing the third satellite in a third rotated orientation, and
    (b) remain in the third rotated orientation during the coverage time interval, such that an omitted location on the surface of the Earth is within the coverage area of the third satellite during the coverage time interval, wherein the omitted location would have been within the coverage area of the first satellite during the coverage time interval, but for the fact that the first satellite remains in the first rotated orientation during the coverage time interval.

11. A method for enhancing the communication capacity of a system of communication satellites in low earth orbits, the satellites including a first satellite and a second satellite, the method comprising:
    operating an attitude control module of the first satellite so as to cause the first satellite to rotate about a roll axis of the first satellite by a first angle when the first satellite passes above a first trigger location on the surface of the Earth, thereby placing the first satellite in a first rotated orientation;

further operating the attitude control module of the first satellite so as to cause the first satellite to remain in the first rotated orientation during a coverage time interval, such that a coverage area of the first satellite and a coverage area of the second satellite overlap, at least in part, during the coverage time interval;

wherein the coverage area of a satellite is a portion of the surface of the Earth wherein Earth terminals can access communication services via the satellite;

wherein the first satellite and the second satellite orbit the Earth in two distinct orbits;

wherein a designated location on the surface of the Earth remains within the part where the coverage areas overlap during the coverage time interval.

12. The method of claim 11 wherein at least two satellite coverage areas overlap over the designated location every day during a predesignated portion of the day.

13. The method of claim 12 wherein the planes of the two orbits intersect one another along a line that crosses the surface of the Earth in a polar region.

14. The method of claim 12 wherein the designated location comprises a portion of the ground track traced by the second satellite during the coverage time interval.

15. The method of claim 12 further comprising:
operating the attitude control module of the second satellite so as to cause the second satellite to rotate about a roll axis of the second satellite by a second angle when the second satellite passes above a second trigger location on the surface of the Earth, thereby placing the second satellite in a second rotated orientation;
further operating the attitude control module of the second satellite so as to cause the second satellite to remain in the second rotated orientation during the coverage time interval, such that the size of the part where the first and second coverage areas overlap becomes larger.

16. The method of claim 12 further comprising:
operating an attitude control module of a third satellite so as to cause the third satellite to rotate about a roll axis of the third satellite by a third angle when the third satellite passes above a third trigger location on the surface of the Earth, thereby placing the third satellite in a third rotated orientation;
further operating the attitude control module of the third satellite so as to cause the third satellite to remain in the third rotated orientation during the coverage time interval, such that an omitted location on the surface of the Earth is within the coverage area of the third satellite during the coverage time interval;
wherein the third satellite orbits the Earth in an orbit that is distinct from the orbit of the first satellite and from the orbit of the second satellite;
wherein the omitted location would have been within the coverage area of the first satellite during the coverage time interval, but for the fact that the first satellite remains in the first rotated orientation during the coverage time interval.

17. The method of claim 11 wherein the planes of the two orbits intersect one another along a line that crosses the surface of the Earth in a polar region.

18. The method of claim 11 wherein the designated location comprises a portion of the ground track traced by the second satellite during the coverage time interval.

19. The method of claim 11 further comprising:
operating the attitude control module of the second satellite so as to cause the second satellite to rotate about a roll axis of the second satellite by a second angle when the second satellite passes above a second trigger location on the surface of the Earth, thereby placing the second satellite in a second rotated orientation;
further operating the attitude control module of the second satellite so as to cause the second satellite to remain in the second rotated orientation during the coverage time interval, such that the size of the part where the first and second coverage areas overlap becomes larger.

20. The method of claim 11 further comprising:
operating an attitude control module of a third satellite so as to cause the third satellite to rotate about a roll axis of the third satellite by a third angle when the third satellite passes above a third trigger location on the surface of the Earth, thereby placing the third satellite in a third rotated orientation;
further operating the attitude control module of the third satellite so as to cause the third satellite to remain in the third rotated orientation during the coverage time interval, such that an omitted location on the surface of the Earth is within the coverage area of the third satellite during the coverage time interval;
wherein the third satellite orbits the Earth in an orbit that is distinct from the orbit of the first satellite and from the orbit of the second satellite;
wherein the omitted location would have been within the coverage area of the first satellite during the coverage time interval, but for the fact that the first satellite remains in the first rotated orientation during the coverage time interval.

* * * * *